United States Patent [19]

Iehisa et al.

[11] Patent Number: 5,043,555
[45] Date of Patent: Aug. 27, 1991

[54] NC LASER DEVICE

[75] Inventors: Nobuaki Iehisa; Kazuhiro Suzuki, both of Minamitsuru, Japan

[73] Assignee: Fanuc Ltd., Minamitsuru, Japan

[21] Appl. No.: 445,672

[22] PCT Filed: Mar. 23, 1989

[86] PCT No.: PCT/JP89/00308
§ 371 Date: Nov. 22, 1989
§ 102(e) Date: Nov. 22, 1989

[87] PCT Pub. No.: WO89/10232
PCT Pub. Date: Feb. 11, 1989

[30] Foreign Application Priority Data

Apr. 22, 1988 [JP] Japan ................................. 63-099464

[51] Int. Cl.⁵ .............................................. B23K 26/04
[52] U.S. Cl. ............................ 219/121.62; 219/121.61; 219/121.83; 364/474.08
[58] Field of Search ..................... 219/121.61, 121.62, 219/121.83; 364/474.08

[56] References Cited

U.S. PATENT DOCUMENTS 4,545,018 10/1985 Clements et al. .................. 364/474
4,555,610 11/1985 Polad et al. ..................... 219/121.61
4,937,422 6/1990 Nagamine et al. .............. 219/121.61

Primary Examiner—C. L. Albritton
Attorney, Agent, or Firm—Staas & Halsey

[57] ABSTRACT

An NC laser device which is a combination of a numerical control apparatus and a laser machining device is provided, and which includes a measuring means for measuring a laser oscillation time and a power measuring means (19) for measuring a laser output power, etc. When the oscillation time is shorter than a predetermined time based on the life of optical components and an output power drop rate is higher than a specified value a message warning that the optical components (5,6) of the device must be cleaned is displayed on a display (18). When the laser oscillation time is longer than the predetermined time and the output power drop rate is higher than the specified value, a message warning that the optical components (5,6) must be replaced is displayed on the display (18), whereby the maintenance of the device is facilitated and the life of the optical components is prolonged.

7 Claims, 2 Drawing Sheets

NC LASER DEVICE

BACKGROUND OF THE INVENTION

FIELD OF THE INVENTION

The present invention relates to an NC laser device which is a combination of a numerical control apparatus and a laser oscillator and used for metal machining and the like, and more particularly, to an NC laser device having a display function for the maintenance of optical components.

DESCRIPTION OF THE RELATED ART

Gas laser oscillators such as a Co2 gas laser, etc., provide a high-power output with high efficiency and have excellent beam characteristics. Accordingly, they are widely used in combination with a numerical control apparatus to function as an NC laser device for metal machining and the like. To improve the oscillation efficiency of this type gas laser oscillator, the high-temperature laser gas heated by laser oscillation must be properly cooled. Therefore the laser gas is constantly circulated through a cooling unit in the device, by using a Roots blower or the like. A Roots blower, however, uses rolling bearings, and accordingly, the laser gas picks up lubrication oil which contaminates and lowers the output of the optical components. Thereafter, after a long term operation, the optical components must be cleaned or replaced to recover the required laser output. Conventionally, the operating term is judged by the operator and the cleaning or replacement of the optical components is carried out in accordance with the operator's judgment.

This procedure, which includes a determination of the operating term, and the judgment on the need for a cleaning or replacement of the optical components, all carried out by the operator, has the following problems.

If the operator forgets or makes an error when determining the term, or misjudges same, the cleaning or replacement of the optical components is not carried out when actually needed. In such a case, the output power of the laser oscillator is lowered, and thus the machining efficiency is reduced or defective machining of workpieces occurs.

Further, if contaminated optical components are not cleaned or replaced, the contaminant absorbs the laser beam and is heated, whereby the optical components are damaged and cannot be restored even by cleaning. Therefore, the judgment of the time at which the optical components must be cleaned or replaced is very important, since it directly affects the life and the performance of the laser oscillator, and effectively eliminates unnecessary replacements of expensive optical components, which is obviously economically undesirable.

SUMMARY OF THE INVENTION

In view of the foregoing, the object of a present invention is to provide an NC laser device capable of displaying information warning an operator of the need to clean or replace optical components of a laser oscillator.

To achieve the above and other objects the present invention provides an NC laser device which is a combination of a numerical control apparatus and a laser oscillator and is able to determine the time at which the optical components of the NC laser device must be cleaned or replaced. The NC laser device comprises a measuring means for measuring a laser oscillation time, and a power measuring means for measuring a laser output power, and is provided with means for displaying a message warning that the optical components must be cleaned when the oscillation time is shorter than a predetermined time based on the life of the optical components and an output power drop rate is higher than a specified value, and for displaying a message warning that the optical components must be replaced when the laser oscillation time is longer than the predetermined time and the output power drop rate is higher than the specified value.

Namely, the laser oscillation time is measured, and when the oscillation time is shorter than the predetermined time and the output power drop rate is lower than the specified value, a message is displayed warning the operator that the optical components must be cleaned.

Further, when the laser oscillation time becomes longer than the predetermined time and the output power drop rate is lower than the specified value, a message is displayed warning the operator that the optical components must be replaced.

Accordingly, the operator need only clean and replace the component parts when warned to do, and thus is not required to judge the operation term, etc. Thus, maintenance is facilitated and the cost of the maintenance of parts is lowered.

DETAILED DESCRIPTION OF THE PREFERRED EMBODIMENT

An embodiment of the present invention will be described with reference to the drawings.

Figure 1:
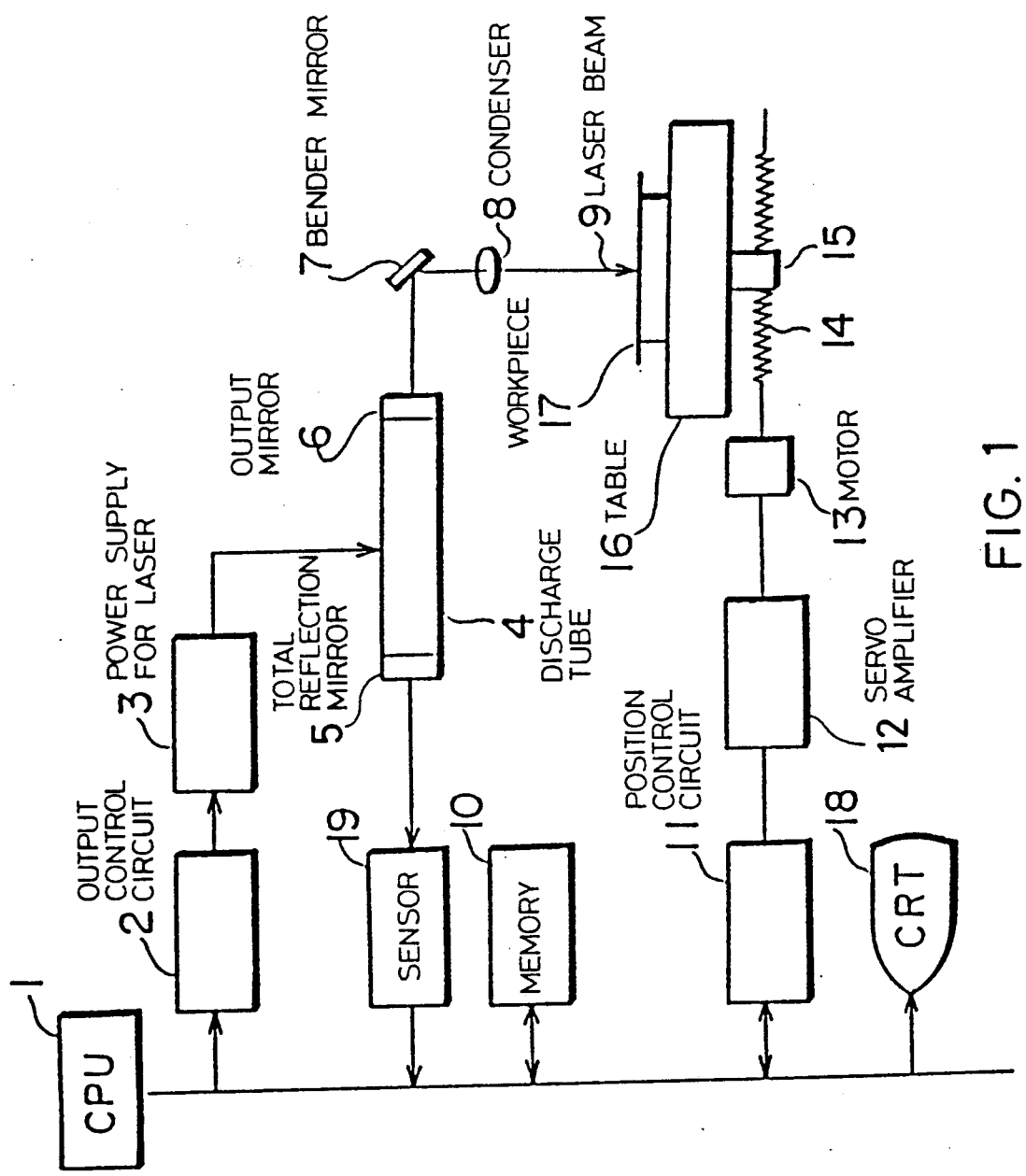
FIG. 1 is a block diagram showing an arrangement of an NC laser device according to a preferred embodiment of the present invention.

FIG. 1 shows an arrangement of an NC laser device used for the embodiment of the invention, which includes a CPU 1 for global control, and an output control circuit 2 for converting an output command value into a current command value as an output. The circuit 2 includes a DIA converter for converting a digital value into an analog output. A power supply 3 for the laser rectifies electric power supplied from a commercial power source and outputs a high-frequency voltage in accordance with the command from the output control circuit 2.

A discharge tube 4 has an internal space in which a laser gas is circulated, and the laser gas is excited when a high-frequency voltage is applied thereto from the laser power supply 3. A total reflection mirror 5 reflects a laser beam, which is reflected back and forth between the total reflection mirror 5 and an output mirror 6. The beam thus accumulates energy from the excited laser gas and is amplified, and a portion of the amplified laser beam is output to the outside by the output mirror 6. The output laser beam 9 is deflected by a bender mirror 7 and irradiated onto the surface of a workpiece 17 by a condenser 8.

A memory 10 stores a machining program, parameters, etc., and comprises a nonvolatile bubble memory or the like. A position control circuit 11 has an output which is amplified by a servo amplifier 12 to control the rotation of a servomotor 13 and the movement of a table 16 through a ball screw 14 and a nut 15, for carrying out machining of the workpiece 17. A display 18 includes a CRT, a liquid-crystal display or the like. A power sensor 19 measures the output power level of the laser oscillator. The measuring a portion of the laser output transmitted through the total reflection mirror 5 for monitoring. This is done by using a thermoelectric conversion element, a photoelectric conversion element or the like.

The CPU 1 measures and integrates the laser oscillation time during individual operations. First, at the startup of the NC laser device, the CPU 1 outputs a predetermined output value (power command value) to the output control circuit 2 of the laser oscillator; then it monitors the actual laser output through the power sensor 19, and reads the actual output value. The CPU 1 then compares the actual output value with the power command value and calculates a drop rate (power drop rate).

When the power drop rate is greater than a predetermined limit value and the laser oscillation time is shorter than a predetermiend time, the CPU 1 outputs a command to display a message on the CRT 18 warning that the optical components must be cleaned. When the power drop rate is greater than the predetermined limit value and the laser oscillation time is longer than the predetermined time, the CPU 1 outputs a commmand to display a message on the CRT 18 warning that the optical components must be replaced. Accordingly, it is unnecessary for the operator to judge the operating term or the output power, and a defective machining which occurs because the operator has not cleaned the optical components, and because the operator has not replaced damaged optical components, can be prevented.

Figure 2:
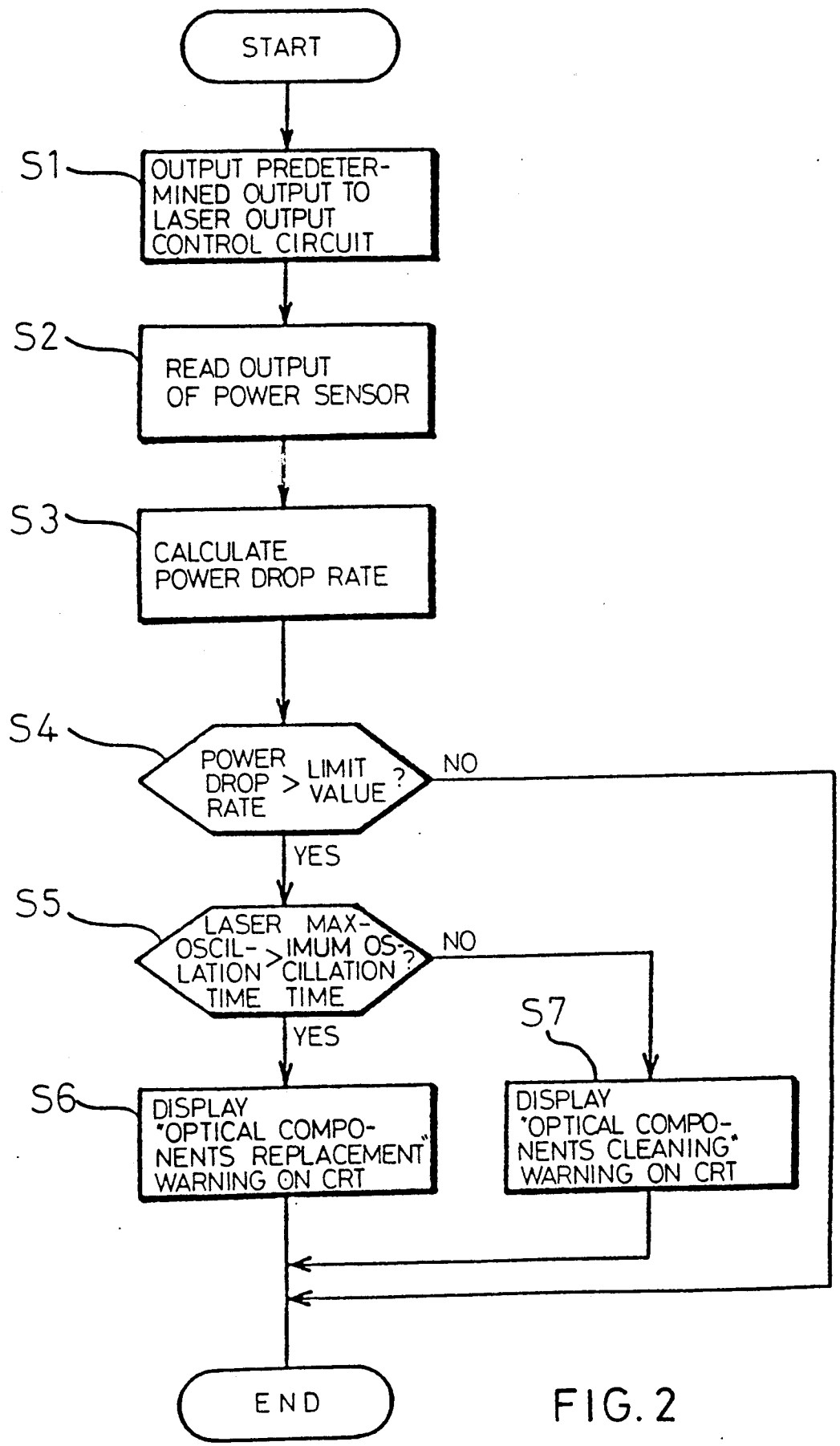
FIG. 2 is a flowchart showing software according to the preferred embodiment of the invention.

Next, a software process according to the above embodiment will be described. FIG. 2 shows a flowchart of the process.

[S1] At the startup of the laser machining device, the CPU 1 outputs the predetermined output value (power command value) to the laser output control circuit 2.

[S2] The actual output value is read via the power sensor 19.

[S3] The power drop rate is calculated from the power command value and the actual output value.

[S4] It is determined whether the power drop rate is greater than the predetermined limit value. If the drop rate is greater than the limit value, the flow proceeds to S5, and if not, the process is ended.

[S5] It is determined whether the laser oscillation ; time is longer than the predetermined maximum oscillation time. If the oscillation time is longer than the predetermined time, S6 is executed, and if not, S7 is executed.

[S6] A message warning that the optical components must be replaced is displayed on the CRT 18.

[S7] A message warning that the optical components must be cleaned is displayed on the CRT 18.

Thus, the optimum time at which the maintenance of the optical components of the laser machining device should be carried out is always displayed after an operation for a predetermined time. A stable performance of the laser machining device can be maintained for a long term operation and the life of the optical components can be prolonged.

As described above, according to the present invention, the oscillation time of the laser oscillator and the laser output power are measured at the startup of the laser oscillator to calculate the power drop rate, and based on the values of the oscillation time and power drop rate, a message warning that the optical components of the laser oscillator must be cleaned or replaced is displayed on the CRT. Therefore, it is not necessary for the operator to judge time at which a maintenance of the optical components is required.

Moreover, since the maintenance can be always performed at the most suitable time, a stable laser output can be maintained for a long term operation and the life of the optical components can be improved.

We claim:

1. An NC laser device which includes a numerical control apparatus and a laser machining device having a laser discharge tube and optical components within the tube, comprising:

means for measuring a laser oscillation time;

means for measuring a laser output power; and means for displaying a message warning that the optical components of the device must be cleaned when said oscillation time is shorter than a predetermined time based on the life of the optical components and an output power drop rate is higher than a specified value, and for displaying a message warning that the optical components of the device must be replaced when the laser oscillation time is longer than said predetermined time and the output power drop rate is higher than said specified value.

2. The NC laser device according to claim 1, wherein the output power is measured at a startup of a laser oscillator.

3. An NC laser device comprising:

a laser discharge tube having optical components therein for reflecting a laser beam therebetween at a predetermined oscillation time;

control means coupled to a power supply for supplying the discharge tube with a predetermined high frequency voltage which constitutes a power command value;

means coupled to the discharge tube, for monitoring an actual laser power output value and outputting a signal indicative thereof to the control means, which calculates a drop rate based on a difference between the power command value and the actual power output value, compares the drop rate to a limit value, calculates an actual oscillation time, compares the actual oscillation time to a predetermined oscillation time; and display means for displaying a first warning to clean the optical components when the drop rate exceeds the limit value.

4. An NC laser device according to claim 3, wherein the display means displays a second warning to replace the optical components when the drop rate exceeds the limit value and the oscillation time is longer than the predetermined time.

5. A method of operating an NC laser device having optical components comprising:

monitoring oscillation time and laser power output;

comparing the oscillation time and laser power output to respective predetermined limits; and displaying a warning when the laser power output falls below the predetermined laser power output limit.

6. A method according to claim 5, further comprising, displaying a warning to replace the optical components when the laser power output falls below the predetermined laser power output limit, and the oscillation time is longer than the predetermined oscillation time limit.

7. A method according to claim 6, wherein the monitoring comprises sensing actual laser power output with sensor ;means outputting a signal to a controller.

* * * * *